(12) United States Patent
Gassmann et al.

(10) Patent No.: US 7,832,668 B2
(45) Date of Patent: Nov. 16, 2010

(54) TWIN-ROTOR BEATING BAR CRUSHER

(75) Inventors: Franz-Josef Gassmann, Ennigerloh (DE); Jürgen Muckermann, Ennigerloh (DE)

(73) Assignee: Thyssenkrupp Fördertechnik GmbH, Essen (DE)

( * ) Notice: Subject to any disclaimer, the term of this patent is extended or adjusted under 35 U.S.C. 154(b) by 2 days.

(21) Appl. No.: 12/092,175

(22) PCT Filed: Aug. 16, 2006

(86) PCT No.: PCT/EP2006/008058

§ 371 (c)(1), (2), (4) Date: Apr. 30, 2008

(87) PCT Pub. No.: WO2007/062700

PCT Pub. Date: Jun. 7, 2007

(65) Prior Publication Data

US 2008/0283644 A1 Nov. 20, 2008

(30) Foreign Application Priority Data

Dec. 1, 2005 (DE) ........................ 10 2005 057 345

(51) Int. Cl.
*B02C 13/20* (2006.01)
(52) U.S. Cl. ...................... 241/187; 241/194
(58) Field of Classification Search .............. 241/187, 241/194, 197, 300
See application file for complete search history.

(56) References Cited

U.S. PATENT DOCUMENTS

| 1,472,609 | A | * | 10/1923 | Martin | 241/43 |
|---|---|---|---|---|---|
| 2,555,879 | A | * | 6/1951 | Fogle | 241/80 |
| 2,661,158 | A | * | 12/1953 | Fogle | 241/80 |
| 2,661,160 | A | * | 12/1953 | Keiper | 241/167 |
| 2,705,596 | A | | 4/1955 | Poyser | |
| 4,087,051 | A | * | 5/1978 | Moeller | 241/27 |
| 4,202,503 | A | * | 5/1980 | Parkinson et al. | 241/194 |
| 5,697,562 | A | * | 12/1997 | Leblond | 241/101.74 |
| 6,953,166 | B2 | * | 10/2005 | Schenk | 241/79 |
| 2005/0263632 | A1 | | 12/2005 | Howard | |
| 2008/0185466 | A1 | * | 8/2008 | Howard | 241/187 |
| 2008/0295740 | A1 | * | 12/2008 | Grasso et al. | 106/716 |

FOREIGN PATENT DOCUMENTS

| CH | 441 955 | 1/1968 |
|---|---|---|
| DE | 254 953 | 12/1912 |
| DE | 469 757 | 12/1928 |
| DE | 1 931 377 | 1/1971 |
| DE | 2 107 919 | 11/1971 |
| DE | 2 053 693 | 5/1972 |
| DE | 42 10 809 | 10/1993 |
| DE | 197 03 583 | 8/1998 |
| DE | 197 13 264 | 10/1998 |
| DE | 201 08 463 U1 | 11/2001 |
| GB | 2 189 406 | 10/1987 |

* cited by examiner

*Primary Examiner*—Faye Francis
(74) *Attorney, Agent, or Firm*—McGlew and Tuttle, P.C.

(57) ABSTRACT

A twin-rotor impact bar crusher is provided for comminuting preferably limestone, marl, clay or similar materials. The impact bar crusher includes two rotors arranged horizontally parallel to one another and impact bars which are rigidly fastened to the circumference of the rotors in a uniformly distributed manner. The impact bars preferably extend over the entire length of the rotors. The two rotors are arranged next to one another at the same height and rotate inwards in opposition to one another.

20 Claims, 2 Drawing Sheets

TWIN-ROTOR BEATING BAR CRUSHER

CROSS REFERENCE TO RELATED APPLICATIONS

This application is a United States National Phase application of International Application PCT/EP2006/008058 and claims the benefit of priority under 35 U.S.C. §119 of German Patent Application DE 102005057345.2 filed Dec. 1, 2005, the entire contents of which are incorporated herein by reference.

FIELD OF THE INVENTION

The present invention pertains to a twin-rotor beating bar crusher for comminuting limestone, marl, clay, rubble or other similar mineral materials with two rotors, which are arranged horizontally in parallel to one another, and with beating bars that are distributed uniformly, are fastened rigidly and preferably extend over an entire length of a crushing space of the rotors.

BACKGROUND OF THE INVENTION

Beating bar crushers, which are also called impact crushers, differ from hammer crushers in that beating bars are arranged, distributed over the circumference and connected rigidly to the respective rotor, on the rotors, which rotate about a horizontal axis, while individual hammers are arranged in a rotatingly movable manner on the circumference in hammer crushers. The beating bars usually extend—undivided or divided—over the entire length of the crushing space and have no gaps, which would be larger than tolerance or expansion joints, in the longitudinal direction of the rotor. In beating bar crushers, the material charged in first meets the beating bars rotating at a circumferential velocity of preferably 20-50 m/sec and is thrown by these onto impact mechanisms so as buffers or deflectors which are placed in opposed position on the respective rotor and is possibly thrown back and comminuted in the process. In hammer crushers the material is comminuted essentially by the mobile hammers.

Impact crushers have designs with one or two rotors.

An impact crusher with one rotor and two or more impact mechanisms, which form essentially the housing of the impact crusher and are pivotable about horizontal axes, is known from DE 197 03 583 A1. A similar impact crusher is known from DE 42 10 809 C2, where a process for changing the impact elements and/or impact bodies is proposed as well.

DE 21 07 919 C2 discloses a twin-rotor impact crusher with rotors, which rotate in the same direction in the direction in which the material is being conveyed and likewise operate against impact walls, and whose horizontal axes are in a plane inclined at an angle of 30° to the horizontal and of which the second rotor is arranged lower than the first one, and in which impact crusher the last of the impact walls associated with the first rotor is arranged such that the materials bouncing off therefrom reach the second rotor. Due to the rotors rotating in the same direction, the material slides obliquely downward between the rotors and the impact walls and only a few of the material reaches the wedge-shaped anvil arranged there. This twin-rotor impact crusher, which belongs to the state of the art, is relatively complicated due to the large number of mobile impact walls needed.

Finally, DE-OS 20 53 693 shows a rotor rotating device for an impact crusher with two rotors, which are arranged next to each other at the same level and rotate outwardly when viewed from the top, wherein impact plates arranged above the rotors are likewise necessary.

SUMMARY OF THE INVENTION

The basic object of the present invention is to provide a twin-rotor beating bar crusher, in which the complicated impact walls can be eliminated and in which the comminuting performance can be increased by utilizing increased impact energy.

According to the present invention two rotors are arranged next to each other at the same level or at nearly the same level and have directions of rotation directed opposite each other and inwardly when viewed from the top. When an anvil strip is used beneath the gap between the two rotors, it proved to be favorable that the anvil strip to be joined by a milling path provided with milling strips in one stage or in a plurality of stages on both sides of the anvil strip in the direction of motion of the material.

Consequently, comminution takes place according to the present invention at first exclusively between the two beating bar crusher rotors working against each other, the material additionally reaching the anvil strip arranged below the gap between the two rotors and subsequently the milling path with one or more milling strips for the additional comminution. To calibrate and set the grain size of the material, the anvil strip and/or the milling strips can be adjusted vertically. In particular, the gap between the beating bars and the anvil strip or the milling strips can be set in a defined manner due to a hydraulic support, and overload protection can be achieved as well. It was found that the new twin-shaft beating bar crusher is subject to reduced wear compared to a hammer crusher because the crushing tools, i.e., the beating bars, are better utilized. This is especially true if the beating bars are fastened to the rotors as reversible beating bars.

Further comminution can be guaranteed due to the use of multi-stage milling paths arranged downstream of the anvil strip. It is possible as a result to do away with screen baskets, which are common in hammer crushers (see for example DE 197 132 64 C1).

The twin-rotor impact crusher according to the present invention has, moreover, the following advantages:

- a higher throughput compared to a hammer crusher of equal size;
- an insensitivity to moisture contents of up to 20% in the material (depending on the size of the product);
- an insensitivity in case of non-crushable material due to the possibility of hydraulically lowering the anvil strip and the milling path;
- a final grain size that can be influenced by the hydraulic adjustment of the milling paths at any time;
- a larger charging opening making it possible to charge larger pieces of material compared to impact crushers of equal output according to the state of the art; and
- a lower energy consumption compared to hammer crushers, because milling operation is eliminated on the screen baskets.

The beating bars are advantageously arranged uniformly distributed over a circumference of each of the first rotor and the second rotor and fastened rigidly thereto. The beating bars extend over an entire length or over nearly an entire length of a crushing space of the respective first rotor and second rotor. The first rotor and the second rotor arranged adjacent to each other at a same level or at nearly the same level have directions of rotation that are opposite each other and are directed inwardly when viewed from a top.

The anvil strip extends between the first rotor and the second rotor under a gap formed by the first rotor and the second rotor and in parallel to rotor axes of the first rotor and the second rotor. The crusher has mounting means whereby the anvil strip is mounted hydraulically adjustable in a vertical direction and/or mounted elastically.

Milling strips may be provided defining a one-stage or multi-stage milling path. The anvil strip is joined on both sides by the one-stage or multi-stage milling path in a direction of motion of the material. Each stage of the milling path may comprise one or more of the milling strips extending in parallel to the anvil plate. The milling strips may advantageously comprise replaceable wearing plates forming a surface thereof.

The anvil strip and the milling strips may advantageously be adjustable relative to one another linearly or in an arc-shaped manner via an adjustable mounting arrangement. The milling strips mounting means may be for hydraulic adjustment of the milling strips in the vertical direction and/or for mounting the milling strips elastically.

The milling strips and the anvil strip may advantageously be arranged on a common column. The twin-rotor beating bar crusher may further comprise an impact crusher housing wherein the anvil strip and the milling strips on the common column can be removed from the impact crusher housing. The anvil strip and/or the milling strips may advantageously be fastened reversibly to the column and the column may include means for hydraulic adjustable mounting and/or means for mounting elastically.

A free space may advantageously be present between adjacent milling strips for drawing off fine material. The beating bars may advantageously be reversibly fastened to the rotors.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
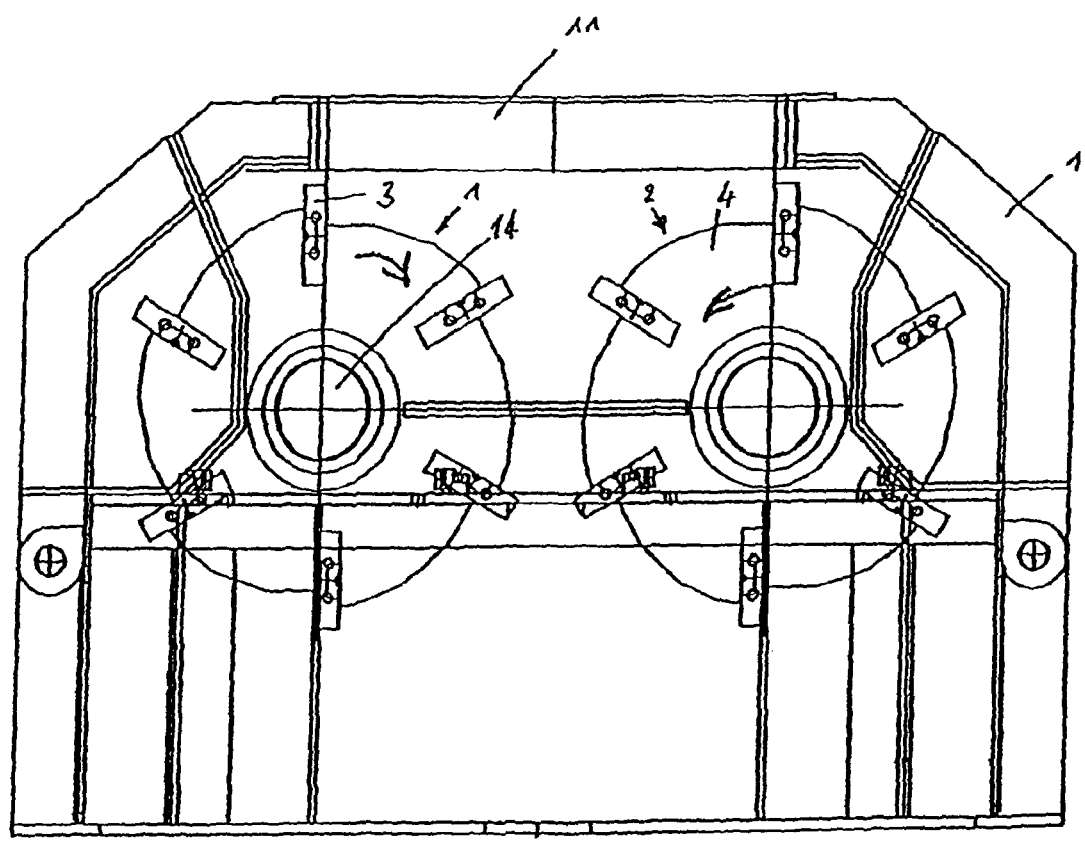
FIG. 1 is a cross section through the impact crusher according to the present invention without anvil strip.

Referring to the drawings in particular, FIG. 1 shows a vertical cross section through an impact crusher with the two rotors 1 and 2, which rotate in opposite directions and on which beating bars 3 arranged uniformly over the circumference are arranged. These beating bars 3 are reversible and are held by a plurality of rotor disks 4 arranged next to each other in the axial direction. The rotor disks 4 are fixed to a central shaft 14 in a manner known per se.

Figure 2:
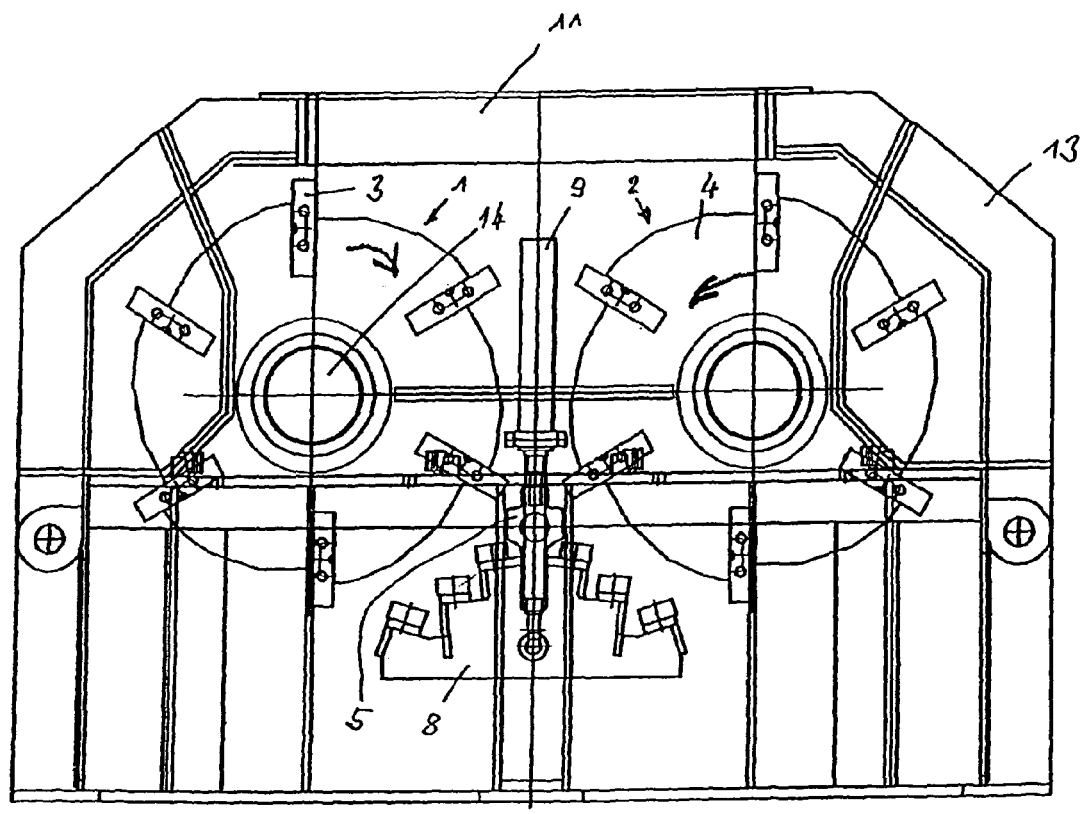
FIG. 2 is a cross section through the impact crusher according to the present invention with anvil strip.
Figure 3:
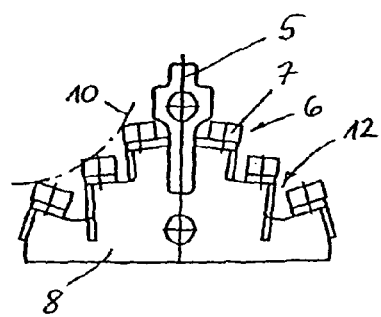
FIG. 3 is a separate view of the column, which can be removed from the housing, with the anvil strip and the milling strips shown.

According to FIG. 2, an anvil strip 5, which extends over the entire length of the rotors 1, 2 and is fastened to a column 8, is located under the gap between the two rotors 1, 2. Milling strips 6 extending in parallel to the anvil strip 5 with replaceable wearing plates 7 are additionally arranged on this column 8. Three milling strips 6, which form an arc-shaped milling path 10 with their upper wearing plates 7, are located on each side of the anvil strip 5 in the shown embodiment. The column 8 with the anvil strip 5 attached thereto and with the milling strips 6 is adjustable in the vertical direction by adjustable mounting means for adjustable mounting of the column 8, with the anvil strip 5 attached thereto and with the milling strips 6, relative to the first rotor 1 and said second rotor 2. The adjustable mounting means may be in the form of a hydraulic cylinder 9 arranged outside the housing 11. The adjustable mounting means for adjustable mounting may be an elastic mount for mounting column 8, with the anvil strip 5 attached thereto and with the milling strips 6, relative to the first rotor 1 and said second rotor 2. The milling strips 6 may have replaceable wearing plates 7 on their surface. The anvil strip 5 and said milling strips 6 may be adjustably mounted in relation to one another linearly or in an arc-shaped manner. The anvil strip 5 and/or the milling strips 6 are hydraulically adjustable in the vertical direction and/or are mounted elastically. The anvil strip 5 and said milling strips 6 on the common column 8 can be removed from the housing 11 of said impact crusher. Free spaces 12, through which the comminuted material can fall, are located between the individual wearing plates 7 or milling strips 6. The entire impact crusher is located in a closed housing 11 with different opening flaps 13 for maintenance and repair purposes.

While specific embodiments of the invention have been shown and described in detail to illustrate the application of the principles of the invention, it will be understood that the invention may be embodied otherwise without departing from such principles.

The invention claimed is:

1. A twin-rotor beating bar crusher for comminuting mineral materials, the twin-rotor beating bar crusher comprising:
   a first rotor;
   a second rotor, said first and second rotor being arranged horizontally in parallel to one another;
   a hydraulic cylinder;
   beating bars arranged uniformly distributed over a circumference of each of said first rotor and said second rotor fastened rigidly thereto and extend over an entire length or over nearly an entire length of a crushing space of the respective said first rotor and said second rotor, said first rotor and said second rotor being arranged next to each other at a same level or at nearly the same level and said first rotor and said second rotor having directions of rotation that are opposite each other and are directed inwardly when viewed from a top; and
   an anvil strip extending between said first rotor and said second rotor under a gap formed by said first rotor and said second rotor and in parallel to rotor axes of said first rotor and said second rotor, said anvil being connected to said hydraulic cylinder, said anvil strip being hydraulically lowered in a vertical direction via said hydraulic cylinder for overload protection of said anvil strip.

2. A twin-rotor beating bar crusher in accordance with claim 1, further comprising: milling strips defining a one-stage or multi-stage milling path, wherein said anvil strip is joined on both sides by said one-stage or multi-stage milling path in a direction of motion of the material.

3. A twin-rotor beating bar crusher in accordance with claim 2, wherein each stage of said multi-stage milling path comprises one of said milling strips extending in parallel to said anvil strip, said one-stage of said milling path comprising one of said milling strips extending in parallel to said anvil strip.

4. A twin-rotor beating bar crusher in accordance with claim 2, wherein said milling strips comprise replaceable wearing plates forming a surface thereof.

5. A twin-rotor beating bar crusher in accordance with claim 2, wherein said milling strips are hydraulically adjustable in the vertical direction and/or are mounted elastically.

6. A twin-rotor beating bar crusher in accordance with claim 2, wherein said milling strips and said anvil strip are arranged on a common column.

7. A twin-rotor beating bar crusher in accordance with claim 6, further comprising an impact crusher housing wherein said anvil strip and said milling strips on said common column can be removed from said impact crusher housing.

8. A twin-rotor beating bar crusher in accordance with claim 6, wherein said anvil strip and/or said milling strips are fastened reversibly to said column and said column is hydraulically adjustable and/or is mounted elastically.

9. A twin-rotor beating bar crusher in accordance with claim 2, wherein a free space is present between adjacent said milling strips for drawing off fine material.

10. A twin-rotor beating bar crusher in accordance with claim 2, wherein said beating bars are reversibly fastened to said rotors.

11. A twin-rotor beating bar crusher in accordance with claim 1, further comprising:
   milling strips comprising wearing plates; and
   a column, said milling strips and said anvil bar being arranged on said column, said column being lowered in said downward vertical direction to a lowered position via said hydraulic cylinder, said anvil bar, said milling strips and said column being elastically mounted with said hydraulic cylinder, said column being adjustable from said lowered position to a normal position, wherein movement of said column alters a dimension of a second gap, said second gap being formed between said anvil strip and said first gap, said anvil bar, said milling strips, said wearing plates and said beating bars being replaceable.

12. A twin-rotor beating bar crusher for comminuting mineral materials, the twin-rotor beating bar crusher comprising:
   a first rotor with beating bars arranged uniformly distributed over a circumference of said first rotor and fastened rigidly thereto and extending radially outwardly in a crushing space of said first rotor;
   a second rotor with beating bars arranged uniformly distributed over a circumference of said second rotor and fastened rigidly thereto and extending radially outwardly in a crushing space of said second rotor, said first and second rotor being arranged horizontally in parallel to one another with said second rotor arranged adjacent to said first rotor at a same level or at nearly the same level of said first rotor, said first rotor and said second rotor having directions of rotation that are opposite each other and are directed inwardly when viewed from a top, wherein a gap is defined between said first rotor and said second rotor;
   an anvil strip extending at a position below said gap and said anvil strip being in parallel to rotor axes of said first rotor and said second rotor; and
   a hydraulic adjustable mounting means connected to said anvil strip for moving said anvil strip in a downward vertical direction relative to said gap in response to an overload condition during rotation of said first rotor and said second rotor for overload protection of said anvil strip.

13. A twin-rotor beating bar crusher in accordance with claim 12, wherein said hydraulic adjustable mounting means is for hydraulically adjusting said anvil strip in a vertical direction and/or mounting said anvil strip elastically.

14. A twin-rotor beating bar crusher in accordance with claim 12, further comprising: a plurality of milling strips defining a one-stage or multi-stage milling path, wherein said milling strips are mounted adjacent to said anvil.

15. A twin-rotor beating bar crusher in accordance with claim 14, wherein each stage of said multi-stage milling path comprises one of said milling strips extending in parallel to said anvil strip, said one-stage of said milling path comprising one of said milling strips extending in parallel to said anvil strip.

16. A twin-rotor beating bar crusher in accordance with claim 14, wherein said milling strips include replaceable wearing plates forming said milling path.

17. A twin-rotor beating bar crusher in accordance with claim 14, further comprising a common column connected to said hydraulic adjustable mounting means and supporting said anvil strip and said milling strips, wherein said common column with said anvil strip and said milling strips are hydraulically adjustable in the vertical direction and/or are mounted elastically relative to said gap and relative to an impact crusher housing via said hydraulic means.

18. A twin-rotor beating bar crusher in accordance with claim 17, wherein said anvil strip and said milling strips on said common column can be removed from said impact crusher housing and wherein said anvil strip and/or said milling strips are fastened reversibly to said column and said column is hydraulically adjustable and/or is mounted elastically via said hydraulic adjustable mounting means.

19. A twin-rotor beating bar crusher in accordance with claim 14, wherein said beating bars are reversibly fastened to said rotors.

20. A twin-rotor beating bar crusher for comminuting mineral materials, the twin-rotor beating bar crusher comprising:
   a first rotor with beating bars arranged uniformly distributed over a circumference of said first rotor and fastened rigidly thereto and extending radially outwardly in a crushing space of said first rotor;
   a second rotor with beating bars arranged uniformly distributed over a circumference of said second rotor and fastened rigidly thereto and extending radially outwardly in a crushing space of said second rotor, said first and second rotor being arranged horizontally in parallel to one another with said second rotor arranged adjacent to said first rotor at a same level or at nearly the same level of said first rotor, said first rotor and said second rotor having directions of rotation that are opposite each other and are directed inwardly when viewed from a top;
   an anvil strip extending beneath a first gap formed between said first rotor and said second rotor and said anvil strip extending in parallel to rotor axes of said first rotor and said second rotor in a first position, wherein a second gap is formed between said anvil strip and said first gap, said second gap having a first dimension in said first position of said anvil strip; and
   a hydraulic adjustable anvil mounting means connected to said anvil strip for moving said anvil strip in downward vertical direction, with respect to said first gap, from said first position to a second position in response to an overloaded state during rotation of said first rotor and said second rotor for overload protection of said anvil strip, said overloaded state corresponding to a state in which unbreakable pieces of material have a size greater than said second gap in said first position, said second gap having a second dimension in said second position of said anvil strip, said second dimension being greater than said first dimension, said anvil strip being located at a first distance from said first gap in said first position, said anvil strip being located at a second distance from said first gap in said second position, said second distance being greater than said first distance.

* * * * *